United States Patent
Walter

(10) Patent No.: US 10,984,263 B2
(45) Date of Patent: Apr. 20, 2021

(54) DETECTION AND VALIDATION OF OBJECTS FROM SEQUENTIAL IMAGES OF A CAMERA BY USING HOMOGRAPHIES

(71) Applicant: Conti Temic microelectronic GmbH, Nuremberg (DE)

(72) Inventor: Michael Walter, Heerbrugg (CH)

(73) Assignee: Conti Temic microelectronic GmbH, Nuremberg (DE)

( * ) Notice: Subject to any disclaimer, the term of this patent is extended or adjusted under 35 U.S.C. 154(b) by 84 days.

(21) Appl. No.: 16/323,826

(22) PCT Filed: Sep. 28, 2017

(86) PCT No.: PCT/DE2017/200102
§ 371 (c)(1),
(2) Date: Feb. 7, 2019

(87) PCT Pub. No.: WO2018/059631
PCT Pub. Date: Apr. 5, 2018

(65) Prior Publication Data
US 2019/0180121 A1    Jun. 13, 2019

(30) Foreign Application Priority Data
Sep. 29, 2016  (DE) ..................... 10 2016 218 852.6

(51) Int. Cl.
*G06K 9/00*    (2006.01)
*B60W 50/14*   (2020.01)

(52) U.S. Cl.
CPC ......... *G06K 9/00805* (2013.01); *B60W 50/14* (2013.01); *B60W 2420/42* (2013.01); *G06T 2207/30261* (2013.01)

(58) Field of Classification Search
CPC ........ G06K 9/00805; G06K 9/38; G06K 9/48; G06K 9/4609; G06T 7/0081;
(Continued)

(56) References Cited

U.S. PATENT DOCUMENTS 6,246,961 B1  6/2001  Sasaki et al.
6,445,809 B1  9/2002  Sasaki et al.
(Continued)

FOREIGN PATENT DOCUMENTS

DE  102004046101  9/2006
DE  102009028742   2/2011
(Continued)

OTHER PUBLICATIONS

English translation of the International Search Report of the International Searching Authority for International Application PCT/DE2017/200102, dated Feb. 1, 2018, 3 pages, European Patent Office, HV Rijswijk, Netherlands.
(Continued)

*Primary Examiner* — Amir Alavi
(74) *Attorney, Agent, or Firm* — W. F. Fasse

(57) ABSTRACT

A method and a device are for identifying objects from camera images, e.g. for driver assistance systems. The method involves: capturing a series of camera images, determining corresponding features in two consecutive images, associating adjacent ones of the corresponding features with a plane in space to determine a plurality of such planes, and detecting objects while taking the determined planes into account.

20 Claims, 6 Drawing Sheets a b

(58) Field of Classification Search
CPC ......... G06T 7/0083; G06T 2207/30261; G06T 2207/20144; G06T 2207/10016; B60W 50/14; B60W 2420/42; G11B 27/28
See application file for complete search history.

(56) References Cited

U.S. PATENT DOCUMENTS

| | | | | |
|---|---|---|---|---|
| 6,731,777 | B1* | 5/2004 | Nishigaki | G01C 3/085 |
| | | | | 382/104 |
| 6,906,620 | B2* | 6/2005 | Nakai | G06K 9/00651 |
| | | | | 340/435 |
| 7,046,822 | B1 | 5/2006 | Knoeppel et al. | |
| 7,330,568 | B2* | 2/2008 | Nagaoka | B60R 1/00 |
| | | | | 382/103 |
| 7,664,314 | B2 | 2/2010 | Stein | |
| 7,925,050 | B2* | 4/2011 | Nagaoka | G06T 7/0002 |
| | | | | 382/104 |
| 8,005,266 | B2* | 8/2011 | Saka | G06K 9/00369 |
| | | | | 382/104 |
| 8,045,759 | B2* | 10/2011 | Mizutani | H04N 7/181 |
| | | | | 382/103 |
| 8,098,889 | B2 | 1/2012 | Zhu et al. | |
| 8,121,348 | B2* | 2/2012 | Hayasaka | G08G 1/166 |
| | | | | 382/103 |
| 9,824,586 | B2* | 11/2017 | Sato | G08G 1/166 |
| 2002/0087269 | A1 | 7/2002 | Sasaki et al. | |
| 2004/0220724 | A1 | 11/2004 | Hahn et al. | |
| 2006/0178830 | A1 | 8/2006 | Sherony | |
| 2009/0169052 | A1 | 7/2009 | Seki et al. | |
| 2010/0194886 | A1 | 8/2010 | Asari et al. | |
| 2010/0260377 | A1* | 10/2010 | Takahashi | G06K 9/3233 |
| | | | | 382/103 |
| 2011/0133917 | A1 | 6/2011 | Zeng | |
| 2013/0010920 | A1 | 1/2013 | Wein et al. | |
| 2014/0161323 | A1 | 6/2014 | Livyatan et al. | |
| 2015/0086080 | A1 | 3/2015 | Stein et al. | |
| 2015/0332114 | A1 | 11/2015 | Springer | |
| 2019/0180121 | A1* | 6/2019 | Walter | B60W 50/14 |
| 2019/0180122 | A1 | 6/2019 | Walter | |
| 2019/0213427 | A1 | 7/2019 | Walter | |

FOREIGN PATENT DOCUMENTS

| | | |
|---|---|---|
| DE | 102015224796 | 6/2017 |
| EP | 2 993 654 | 3/2016 |
| WO | WO 2015/177648 | 11/2015 |

OTHER PUBLICATIONS

PCT International Preliminary Report on Patentability including English Translation of PCT Written Opinion of the International Searching Authority for International Application PCT/DE2017/200102, dated Apr. 2, 2019, 6 pages, International Bureau of WIPO, Geneva, Switzerland.

German Search Report for German Patent Application No. 10 2016 218 852.6, dated Apr. 26, 2018, 8 pages, German Patent and Trademark Office, Muenchen, Germany, with partial English translation, 6 pages.

Johann Prankl et al., "Interactive Object Modelling Based on Piecewise Planar Surface Patches", Computer Vision and Image Understanding, vol. 117, No. 6, Jun. 1, 2013, XP55162053, ISSN: 1077-3142, pp. 718 to 731.

Peng Chang et al., "Stereo-Based Vision System for Automotive Imminent Collision Detection", IEEE Intelligent Vehicles Symposium, University of Parma, Parma, Italy, Jun. 14-17, 2004, XP010727481, ISBN: 978-0-7803-8310-4, pp. 274 to 279.

Prateek Singhal et al., "Top Down Approach to Detect Multiple Planes in Images", Proceedings of the 2014 Indian Conference on Computer Vision Graphics and Image Processing, New York, USA, Jan. 1, 2014, XP055439700, ISBN: 978-1-4503-3061-9, 6 pages.

Richard Hartley et al., "Tutorial: Multiple View Geometry", CVPR Jun. 1999, https://de.scribd.com/document/96810936/Hartley-Tut-4up, accessed on Sep. 26, 2016, 57 pages.

Masatoshi Okutomi et al., "Robust Estimation of Planar Regions for Visual Navigation Using Sequential Stereo Images", Proceedings of the 2002 IEEE International Conference on Robotics and Automation, Washington, D.C., vol. 4, May 11, 2002, XP032882657, ISBN: 978-0-7803-7272-6, pp. 3321 to 3327.

European Examiner Wim Meurisse, European Office Action dated Mar. 9, 2021 in European Patent Application No. 17 794 220.8, 6 pages., with English partial translation, 3 pages.

Manolis I.A. Lourakis et al., "Detecting Planes in an Uncalibrated Image Pair", Proceedings of the 13th British Machine Vision Conference: Sep. 2-5, 2002, Cardiff University, Jan. 1, 2002, XP055439691, ISBN: 978-1-901725-19-3, pages 57.1 to 57.10 (pp. 587 to 596).

* cited by examiner

DETECTION AND VALIDATION OF OBJECTS FROM SEQUENTIAL IMAGES OF A CAMERA BY USING HOMOGRAPHIES

FIELD OF THE INVENTION

The invention relates to a method for identifying objects from images from a camera and can be used in particular in camera-based driver assistance systems.

BACKGROUND INFORMATION

Vehicle identification systems according to the current prior art are mostly classification-based. Classification-based systems can recognize vehicles or vehicle components which they have seen in their training data. New vehicle designs, as well as changing structures can, however, result in a considerably reduced system performance and require generic approaches for identifying objects.

US 2014/0161323 A1 shows a method for producing dense three-dimensional structures in a road environment from images which are captured with a mono camera.

EP 2 993 654 A1 shows a method for forward collision warning (FCW) from camera images. In this case, an image section in which the ego vehicle will arrive within a pre-defined time interval is analyzed. If an object is identified there, a collision warning is output.

SUMMARY OF THE INVENTION

It is an object of the present invention to indicate a method for generically identifying objects.

The following considerations form the starting point of the invention: if the camera positions of two frames (individual images) are known, point correspondences (corresponding feature points) can be triangulated, but no objects are generated because the triangulation does not have any model knowledge which could cluster a cloud of points into meaningful objects.

The disadvantages of monocular systems are that objects close to the epipole can only be triangulated inaccurately and the smallest errors in the egomotion (the camera's own motion) can make themselves felt. The pixel in a first camera image, at which the center of the camera is imaged at a second point in time, is designated the epipole. When the vehicle is driving straight ahead, the vanishing point corresponds e.g. to the epipole. This is, however, the relevant region in order to identify collisions with stationary vehicles or vehicles driving ahead. Dynamic objects can be triangulated if they are moving in accordance with epipolar geometry. However, they are estimated as being too close or too far away because the relative speed is not known.

If, instead of individual correspondences, multiple adjacent correspondences (corresponding features) are observed, objects can be segmented due to different speeds, scalings and deformation.

A method according to the invention for detecting objects from a series of images from a vehicle camera comprises the following steps:

a) capturing a series of images by means of the vehicle camera, b) determining corresponding features in two consecutive images, d) establishing a plurality of planes in space by an association of adjacent, corresponding features with, in each case, one plane in space, and f) detecting objects, by taking account of the planes established (in step d)).

The vehicle camera is preferably configured to capture the surroundings of a vehicle. The surroundings are in particular the surroundings lying in front of the vehicle. The vehicle camera can preferably be integrated into a driver assistance device or can be connected thereto, wherein the driver assistance device is in particular configured to identify objects from the image data provided by the vehicle camera device. The vehicle camera device is preferably a camera which is to be arranged in the interior of the motor vehicle behind the windshield and aimed in the direction of travel. The vehicle camera is particularly preferably a monocular camera.

Individual images are preferably captured by means of the vehicle camera at specific or known points in time, resulting in a series of images.

The correlation of a feature in a first image to the same feature in a second image is designated a correspondence. Corresponding features in two images can also be described as a flux vector which indicates how the feature has moved in the image. A feature can in particular be an image section (or patch), a pixel, an edge or a corner.

Step d) can alternatively be described as follows: determining multiple planes, in which a multiplicity of adjacent corresponding features lies or comes to lie in each case.

It is also subsumed under step d) that a plurality of planes is predefined in space, and an association of adjacent, corresponding features with, in each case, one of the pre-defined planes is carried out (cf. step d2 below)).

In the context of the present invention, the term "plane" describes the following relationships: on the one hand, a criterion for accumulating adjacent corresponding features, i.e. these are considered to be associated if they lie in a common plane in space and develop over time in accordance with the motion of the plane.

Corresponding features accumulated in that manner are subsequently designated as e.g. a "ground plane", because they all lie in the plane which corresponds to the road plane. However, such a ground plane does not extend ad infinitum, but means a partial region of the plane, namely that region in which actually corresponding features are arranged.

In step f) the formulation "by taking account of . . . " means that the multiple planes established in step d) are taken account of during the detection of objects. This can take place, for example, in such a way that a road hypothesis is deduced from an identified ground plane, and that an object hypothesis is generated for an elevated object from a back plane or a side plane. A free space can already be detected for elevated objects from a road hypothesis and object hypothesis (hypotheses), which indicates which free space can currently be driven in the surroundings of the vehicle. An advantageous application of the free space detection lies e.g. in road edge determination which does not depend on the identification of lane markings.

Therefore, the wording "detection of objects" can, for example, denote a generation of object hypotheses or objects.

According to a preferred embodiment, the method comprises the following step:

c) computing homographies (also called homographs herein) for adjacent corresponding features in order to establish the plurality of planes.

A homography or homograph describes the correspondence of points on one plane between two camera positions or the correspondence of two points in two consecutive images from the vehicle camera. By computing homographies i.e. homographs for adjacent corresponding features, thereby adjacent, corresponding features can, in each case, be associated with a plane in space (see step d)).

The method advantageously comprises the following step:

e) segmenting the corresponding features by means of the computed homographs.

The corresponding features can in particular be segmented, that is to say associated with different segments by means of the computed homographs. A detection of objects can then take place in step f), by taking account of the segmented features.

One advantageous further development of the method comprises the step d2): Association of adjacent, corresponding features with, in each case, a ground plane, a back plane or a side plane. In the case of a coordinate system, in which the x-direction runs horizontally or laterally, the y-direction runs vertically and the z-direction runs in the vehicle longitudinal direction, a ground plane can be predefined normally to the y-direction, a back plane can be predefined normally to the z-direction and a side plane can be predefined normally to the x-direction.

By computing homographs of a ground plane, a back plane and a side plane, an association with one of these planes can be made for adjacent, corresponding features.

The homographies (also called homographs herein) for the back plane can preferably be computed in accordance with equation (10) or for the ground plane in accordance with equation (9) or for the side plane in accordance with equation (11). In this case, a, b, c are constants, $x_0$, $y_0$, $x_1$, $y_1$ designate correspondences in the second image (index 0) captured at a later point in time t–0 and the first image (index 1) captured at an earlier point in time t–1, and $t_x$, $t_y$, $t_z$ are the components of the vector t/d. t describes the translation of the vehicle camera and d describes the distance from a plane (perpendicular to said plane), that is to say along the normal vector of this plane. The components $t_x$, $t_y$ or $t_z$ are also designated below as an "inverse TTC". TTC comes from "time to collision" and results, in one spatial direction, from the clearance i.e. spacing distance divided by the translational speed.

According to one advantageous further development, if multiple planes having an identical orientation occur, the planes having an identical orientation can be separated by means of the associated $t_x$, $t_y$, $t_z$ values. For example, two back planes which are at differing distances in the z-direction from the vehicle camera can be distinguished from one another by means of different $t_z$ values.

An image can preferably be subdivided by a grid into similar cells, and a homograph can be computed for each cell from the corresponding features determined therein. Cells having a matching homograph can subsequently be clustered.

If the computed homography or homograph of a first cell does not sufficiently match the homograph of an adjacent cell, a so-called back projection error or reprojection error of individual corresponding features can preferably and advantageously be observed in order to determine a plane boundary.

Corresponding features can be assessed by the back projection error. The back projection error indicates the difference between the measured flux and the flux predicted from the computed homography or homograph. In other words, the back projection error of a plane designates the difference between a point x at the point in time t–0 and the corresponding point imaged according to the homography of this plane at the previous point in time t–1 (see below: equation 4).

If the back projection error of a corresponding feature in a first cell is compared with the back projection errors of the homographies of the adjacent cells and this corresponding feature is assigned to the homography having the lowest error, thereby the plane boundary (or segment boundary or cluster boundary) can be refined within the first cell. In this way, various corresponding features of a cell can be associated with different planes.

The association of planes with adjacent, corresponding features can preferably be substantially determined in the whole image of the vehicle camera (e.g. in at least 80% of the image area, preferably at least 90%). Because the method according to the invention can be designed to be very fast, generic object detection or scene interpretation is possible for nearly the whole image in real time.

The subject matter of the invention is furthermore a device for detecting objects from a series of images from a vehicle camera comprising a camera control unit and evaluation electronics, wherein the camera control unit is set up or configured a) to capture a series of images by means of the vehicle camera; and wherein the evaluation electronics are set up/configured b) to determine corresponding features in two consecutive images, d) to establish a plurality of planes in space by an association of adjacent, corresponding features with, in each case, one plane in space, and g) to detect (or to generate) one or more objects, by taking account of the planes established (in step d)).

The camera control unit or the evaluation electronics can in particular comprise a microcontroller or processor, a digital signal processor (DSP), an ASIC (Application Specific Integrated Circuit), a FPGA (Field Programmable Gate Array) and the like as well as software for performing the relevant control or evaluation steps. The present invention can consequently be implemented in digital electronic circuits, computer hardware, firmware or software.

BRIEF DESCRIPTION OF THE DRAWINGS

Further features, advantages and effects of the invention are set out by the following description of preferred embodiment examples of the invention, wherein.

DETAILED DESCRIPTION OF EXAMPLE EMBODIMENTS OF THE INVENTION

Figure 1:
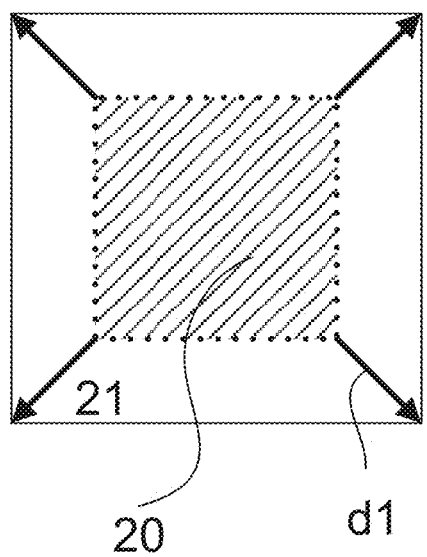
FIG. 1 schematically shows a typical deformation of an approaching back plane.

Parts corresponding to one another are, as a general rule, provided with the same reference numerals in all of the figures.

FIG. 1 schematically shows a back plane which occupies the region (20, dotted line) represented by hatching, at an earlier first point in time t−1. At a subsequent second point in time t, i.e. t−0, the clearance or spacing distance between the vehicle camera and the back plane has decreased, resulting in the deformation of the region (21, continuous line) of the back plane in the image as indicated by the arrows (d1). The region (20; 21) is scaled or increased as a consequence of the relative motion of the vehicle camera with respect to the back plane.

Figure 2:
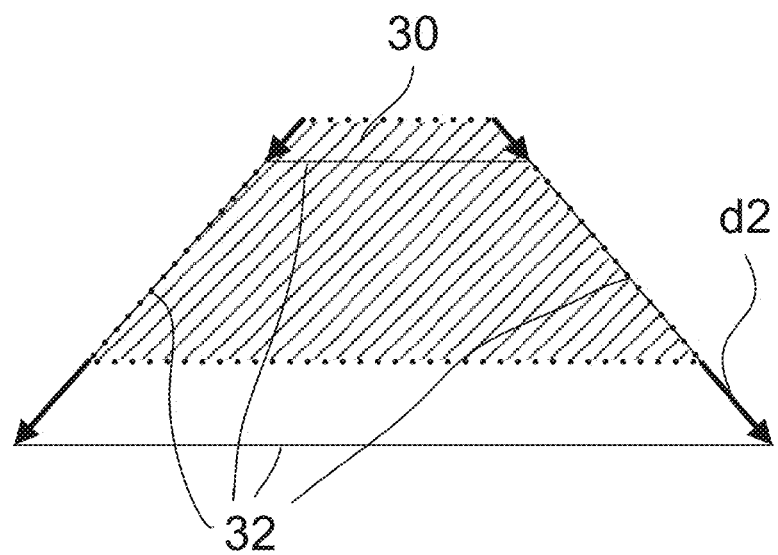
FIG. 2 schematically shows a typical deformation of an approaching ground plane.

FIG. 2 schematically shows a ground plane which occupies the region (30, dotted line) represented by hatching at an earlier first point in time t−1. This could be a section of a road surface, on which the vehicle is driving. As a consequence of the egomotion of the vehicle camera, the region (as represented in the image) changes at a subsequent second point in time t, i.e. t−0, resulting in the deformation of the region (32) of the ground plane as indicated by the arrows (d2). At the second point in time t, the lines designated with 32 delimit the region of the ground plane. Here, the term "ground plane" thus denotes a delimited region on the road surface. The edge region is produced e.g. from signatures (or edge points) on the road surface, which can be tracked in the series of images.

Figure 3:
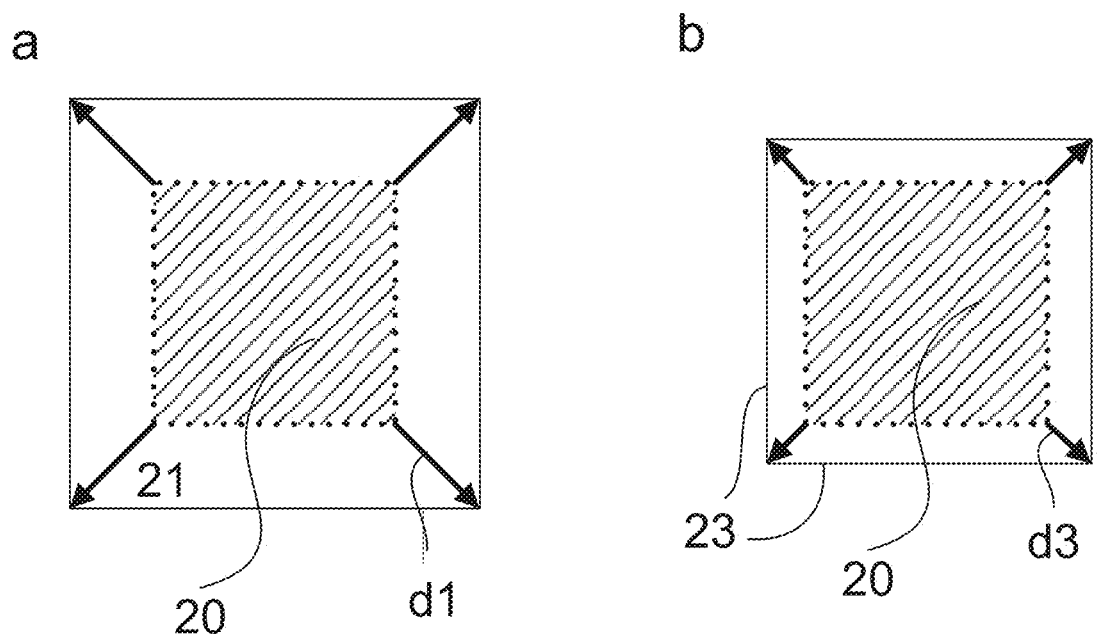
FIG. 3 schematically shows a typical deformation of a) a rapidly approaching back plane and b) a slowly approaching or more distant back plane.

FIG. 3 illustrates the difference between a quickly approaching back plane (FIG. 3a: 20, 21; deformation d1) and a slowly approaching back plane (FIG. 3b: 20, 23; deformation d3), if at the point in time t−1 the back plane (20) in FIG. 3a has the same clearance or spacing distance from the vehicle camera as the back plane (20) in FIG. 3b.

Alternatively, FIG. 3 could represent the difference between a close back plane (FIG. 3a: 20, 21; deformation d1) and a more distant back plane (FIG. 3b: 20, 23; deformation d3), which are moving e.g. at the same (relative) speed, in which case the object (20, 23) represented in FIG. 3b would be larger in real space than the object (20, 21) represented in FIG. 3a.

If, instead of individual correspondences, multiple adjacent correspondences are observed, objects can be segmented due to different speeds, scalings and deformation.

If it is assumed that the world consists of planes, these can be described by homographies (also called homographs herein) and can be separated as shown below by means of their distance, speed and orientation.

A homography or homograph describes the correspondence of points on one plane between two camera positions or the correspondence of two points in two consecutive frames:

$$x_{t0} = H * x_{t1} \, mit \, x_{t0} = \begin{bmatrix} x_0 \\ y_0 \\ 1 \end{bmatrix}, \text{ wherein } x_{t1} = \begin{bmatrix} x_1 \\ y_1 \\ 1 \end{bmatrix}. \quad (1)$$

In this case, the vector $x_{t0}$ to describes the 3D correspondence at the point in time t−0 of the vector $x_{t1}$ at the point in time t−1. A homography or homograph can be computed, in an image-based manner, by knowledge of four point correspondences (cf. Tutorial: Multiple View Geometry, Hartley, R. and Zisserman, A., CVPR June 1999: https://de.scribd.com/document/96810936/Hartley-Tut-4up accessed on 26.09.2016). The relationships indicated at the top left (slide 21) of page 6 of the tutorial can be formulated as follows in the notation of equation 1:

$$\begin{bmatrix} -x_0 & -y_0 & -1 & 0 & 0 & x_1 x_0 & x_1 y_0 & x_1 \\ 0 & 0 & 0 & -x_0 & -y_0 & -1 & y_1 x_0 & y_1 y_0 & y_1 \\ & & & & \vdots & & & \end{bmatrix} * \begin{bmatrix} h_1 \\ h_2 \\ h_3 \\ h_4 \\ h_5 \\ h_6 \\ h_7 \\ h_8 \\ h_9 \end{bmatrix} = 0 \quad (2)$$

where $$H = \begin{bmatrix} h_1 & h_2 & h_3 \\ h_4 & h_5 & h_6 \\ h_7 & h_8 & h_9 \end{bmatrix}.$$

Alternatively, knowing the camera translation t, the rotation R and the distance d along the normal vector n of the plane, the homograph can be computed in accordance with equation 3. Equation 3 illustrates that, at a nonzero inverse TTC t/d, planes having a different orientation n can be modelled and that planes having an identical orientation n can be separated by means of their inverse TTC.

$$H = \left[ R - \frac{t * n'}{d} \right] \quad (3)$$

A homograph can be theoretically decomposed into the normal vector n, the rotation matrix R and the inverse TTC t/d. Unfortunately, this decomposition is numerically extremely unstable and sensitive to measuring errors.

If a scene is described by planes, it can be segmented as indicated below.

Figure 4:
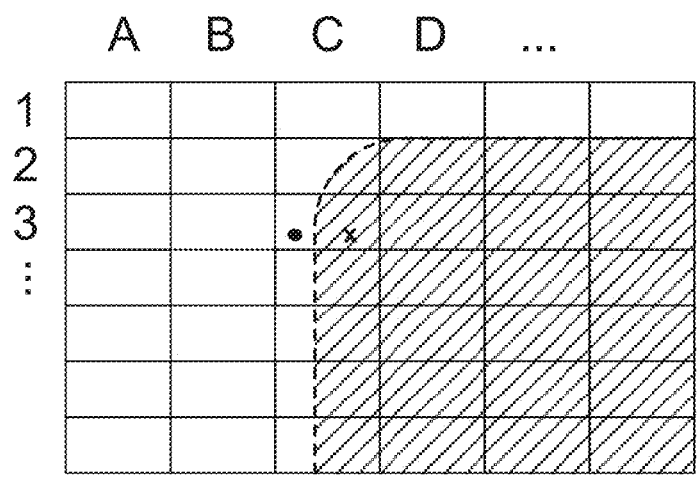
FIG. 4 schematically shows a subdivision of an image having two different segments into cells.

FIG. 4 schematically shows a subdivision into cells (grid, gridlines). The scene is subdivided into NxM initial cells and a clear i.e. unambiguous or unique ID is assigned respectively to each point correspondence. This ID firstly indicates the affiliation to a cell. The ID can subsequently indicate the affiliation to a cluster or an object.

An object (in particular a back plane) is represented hatched in the foreground. The background is represented in white. If a cell only comprises one object (cells B3, D3), a homography or homograph will describe this cell very well. If, however, a cell contains more than one object (cell C3), the homograph will not describe either of the two objects well. If the point correspondences (black dot or black cross or x) are associated with the clusters (or segment) of the adjacent cells (B3 or D3) by means of their back projection errors, the black dot is associated with the segment of the cell B3 and the black cross is associated with the segment of the cell D3, because the homograph for the cell C3 does not describe either the foreground or the background well.

If prior knowledge of a scene exists, the segment sizes can be adjusted to the scene in that e.g. larger regions in the close region of the vehicle or in regions having a positive classification answer can be generated. A dedicated back plane, ground plane and side plane homograph i.e. homography is computed for each segment, as shown in equations 5 to 10.

The computation of the back plane, ground plane and side plane homograph i.e. homography increases the selectivity because a homography with fewer degrees of freedom can only poorly model regions which contain different planes and, consequently, corresponding points will have a higher back projection error, see FIG. 4. Therefore, the back projection error $e_i$ is a measure of how well a point x at the point in time t–0 is described by the homography of a plane i of the corresponding point at the point in time t–1.

$$e_i = x_{t0} - H_i x_{t1}. \quad (4)$$

If the static installation position of the camera and camera rotation are assumed in two different views (e.g. due to knowledge of the camera calibration and due to the computation of the fundamental matrix in a monocular system or due to rotation values of a rotation rate sensor cluster), the inverse TTC t/d can be computed by means of the flux vectors compensated for by the static camera rotation, as is shown below by way of example for a ground plane n'= [010]. If the rotation is not known, it can be approximately replaced by a unit matrix.

If the quotient t/d is substituted by the inverse time to collision in $$\begin{bmatrix} t_x \\ t_y \\ t_z \end{bmatrix}$$

equation 3, it follows that $$\begin{bmatrix} x_0 \\ y_0 \\ 1 \end{bmatrix} = \begin{bmatrix} R - \begin{bmatrix} 0 & t_x & 0 \\ 0 & t_y & 0 \\ 0 & t_z & 0 \end{bmatrix} \end{bmatrix} \begin{bmatrix} x_1 \\ y_1 \\ 1 \end{bmatrix} \Rightarrow \begin{bmatrix} x_0 \\ y_0 \\ 1 \end{bmatrix} - R \begin{bmatrix} x_1 \\ y_1 \\ 1 \end{bmatrix} = - \begin{bmatrix} 0 & t_x & 0 \\ 0 & t_y & 0 \\ 0 & t_z & 0 \end{bmatrix} \begin{bmatrix} x_1 \\ y_1 \\ 1 \end{bmatrix}. \quad (5)$$

By introducing the constants a, b, c, wherein equation 5 produces the simplified form:

$$\begin{bmatrix} a \\ b \\ c \end{bmatrix} := R \begin{bmatrix} x_1 \\ y_1 \\ 1 \end{bmatrix} \quad (6)$$

$$\begin{bmatrix} x_0 \\ y_0 \\ 1 \end{bmatrix} - \begin{bmatrix} a \\ b \\ c \end{bmatrix} = - \begin{bmatrix} t_x y_1 \\ t_y y_1 \\ t_z y_1 \end{bmatrix} \Rightarrow \begin{bmatrix} x_0 \\ y_0 \\ 1 \end{bmatrix} = \begin{bmatrix} a \\ b \\ c \end{bmatrix} - \begin{bmatrix} t_x y_1 \\ t_y y_1 \\ t_z y_1 \end{bmatrix}.$$

The result of standardizing the homogeneous coordinates is:

$$x_0(c - t_z y_1) = a - t_x y_1 \quad (7)$$

$$y_0(c - t_z y_1) = b - t_y y_1 \quad (8)$$

For more than one measurement, an equation system of the form Mx=v, with a vector x to be established, a matrix M and a vector v (see equation 9) is produced, which can be solved for at least three image correspondences as sampling points by e.g. a singular value decomposition or a least squares method:

$$\begin{bmatrix} x_0 c - a \\ y_0 c - b \\ \vdots \end{bmatrix} = \begin{bmatrix} -y_1 & 0 & y_1 x_0 \\ 0 & -y_1 & y_1 y_0 \\ \vdots & & \end{bmatrix} * \begin{bmatrix} t_x \\ t_y \\ t_z \end{bmatrix} \quad (9)$$

The back and side plane homographies can be deduced similarly and respectively produce:

$$\begin{bmatrix} x_0 c - a \\ y_0 c - b \\ \vdots \end{bmatrix} = \begin{bmatrix} -x_1 & 0 & x_1 x_0 \\ 0 & -x_1 & x_1 y_0 \\ \vdots & & \end{bmatrix} \begin{bmatrix} t_x \\ t_y \\ t_z \end{bmatrix} \quad (10)$$

and $$\begin{bmatrix} x_0 c - a \\ y_0 c - b \\ \vdots \end{bmatrix} = \begin{bmatrix} -1 & 0 & x_0 \\ 0 & -1 & y_0 \\ \vdots & & \end{bmatrix} \begin{bmatrix} t_x \\ t_y \\ t_z \end{bmatrix}. \quad (11)$$

In order to segment larger objects consisting of multiple cells, adjacent cells can be combined in a further step, in that the back projection errors $\Sigma x_{t0}{}^i - H_j x_{t1}{}^i$ or $\Sigma x_{t0}{}^j - H_j x_{t1}{}^j$ are computed by means of sampling points (see point 1 below: RANSAC) of the adjacent segments j and i and their homographs i.e. homographies. Two adjacent clusters are combined, if $\Sigma x_{t0}{}^i - H_j x_{t1}{}^i$ is less than $\Sigma x_{t0}{}^i - H_i x_{t1}{}^i$ or e.g. the back projection error standardized for the predicted flux length is below an adjustable threshold. In particular, two adjacent clusters can be combined, if $\Sigma x_{t0}{}^i - H_j x_{t1}{}^i$ is less than $\Sigma x_{t0}{}^j - H_j x_{t1}{}^i$ and the two back projection errors $\Sigma x_{t0}{}^j - H_j x_{t1}{}^i$ and $\Sigma x_{t0}{}^i - H_j x_{t1}{}^i$ fall below a threshold standardized for the flux length. Alternatively, back projection errors can be used as potentials in a graph and a global solution can be computed. The compactness of the clusters can, in this case, be established via the edge potentials in the graph.

If the segments have been combined, the homographs i.e. homographies are computed again and the point correspondences are associated with the clusters having the smallest back projection error. If only directly neighboring clusters are observed, very compact objects can be generated. If the minimum error exceeds an adjustable threshold, new (cluster/object) IDs are assigned to the correspondences, in order to be able to identify partially concealed objects or objects having a slightly different TTC. By adjusting the threshold, the resolution of (slightly) different objects can be adjusted.

The back projection errors can be provided with a bias which reduces the costs for related regions or a bias which increases the costs for an ID change, if point correspondences were to have the same ID affiliation over a longer period of time.

Figure 5:
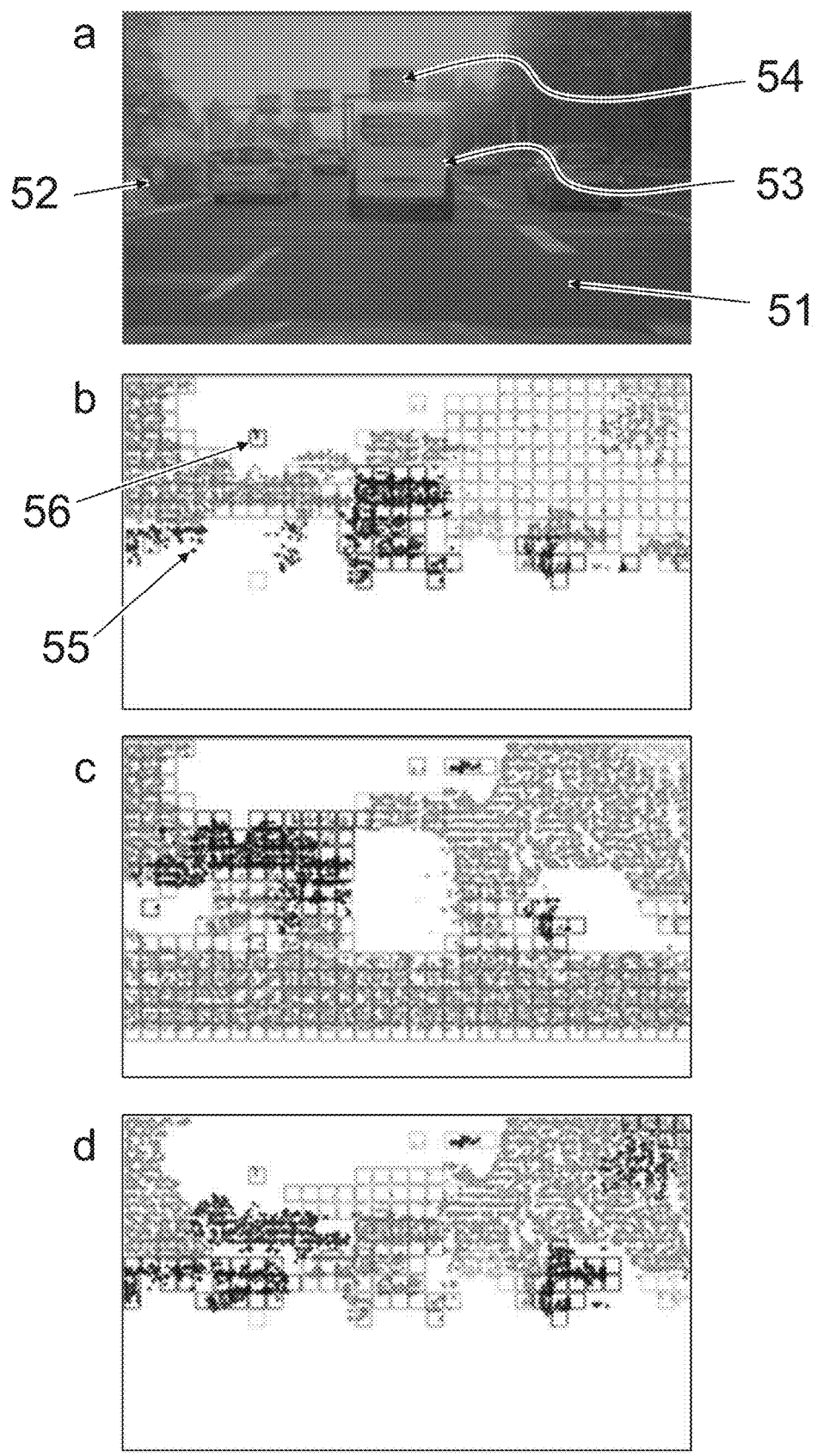
FIG. 5 shows segmenting results following a third iteration step.

FIG. 5 shows one example of a scene segmentation:

FIG. 5a shows an image which has been captured by a vehicle camera which is arranged in the interior of the vehicle and records the surroundings lying ahead through the windshield. A three-lane road (51), e.g. a motorway, can be seen. The lanes are separated by appropriate lane markings. Vehicles are driving on all three lanes. The vehicle (53) driving ahead on the ego lane possibly conceals further vehicles driving ahead, which are located on the ego lane. A structural elevated delimitation (52) with respect to the opposite carriageway is located on the left of the three-lane road. A shoulder or breakdown lane, which is delimited to the right by a guardrail, behind which there is woodland, is located to the right of the three-lane road (51). Sign gantries (54) can be identified some distance in front of the ego vehicle, one of which spans the three-lane road (51).

This scene can be segmented in a similar way to the method described by means of FIG. 4. In FIGS. 5b to 5d, cells (56) can be identified. Point correspondences (55) are represented in the cells. The association of a cell (56) with a segment is represented by means of the color of the cell border or the point correspondences (55).

FIG. 5b shows the red channel of the segmented image, FIG. 5c shows the green channel and FIG. 5d shows the blue channel.

Different segments have been provided with different colors. A segment, which is green in the original, extends over the lowest five to six lines (accordingly represented in white in FIGS. 5b and 5d and without a cell border).

This segment corresponds to the ground plane, that is to say the surface of the road (51) on which the ego car is driving.

A further segment can be identified in the middle of the image, in the original it is pink. It therefore has high red values in FIG. 5b, weaker blue values in FIG. 5d and no green values in FIG. 5c.

This segment corresponds to the back plane of the (transporter) vehicle (53) driving ahead on the ego lane.

The segmenting result shown was determined without prior knowledge of the scene in only three iteration steps. This shows the enormous speediness and performance of an embodiment of the invention by temporal integration.

Figure 6:
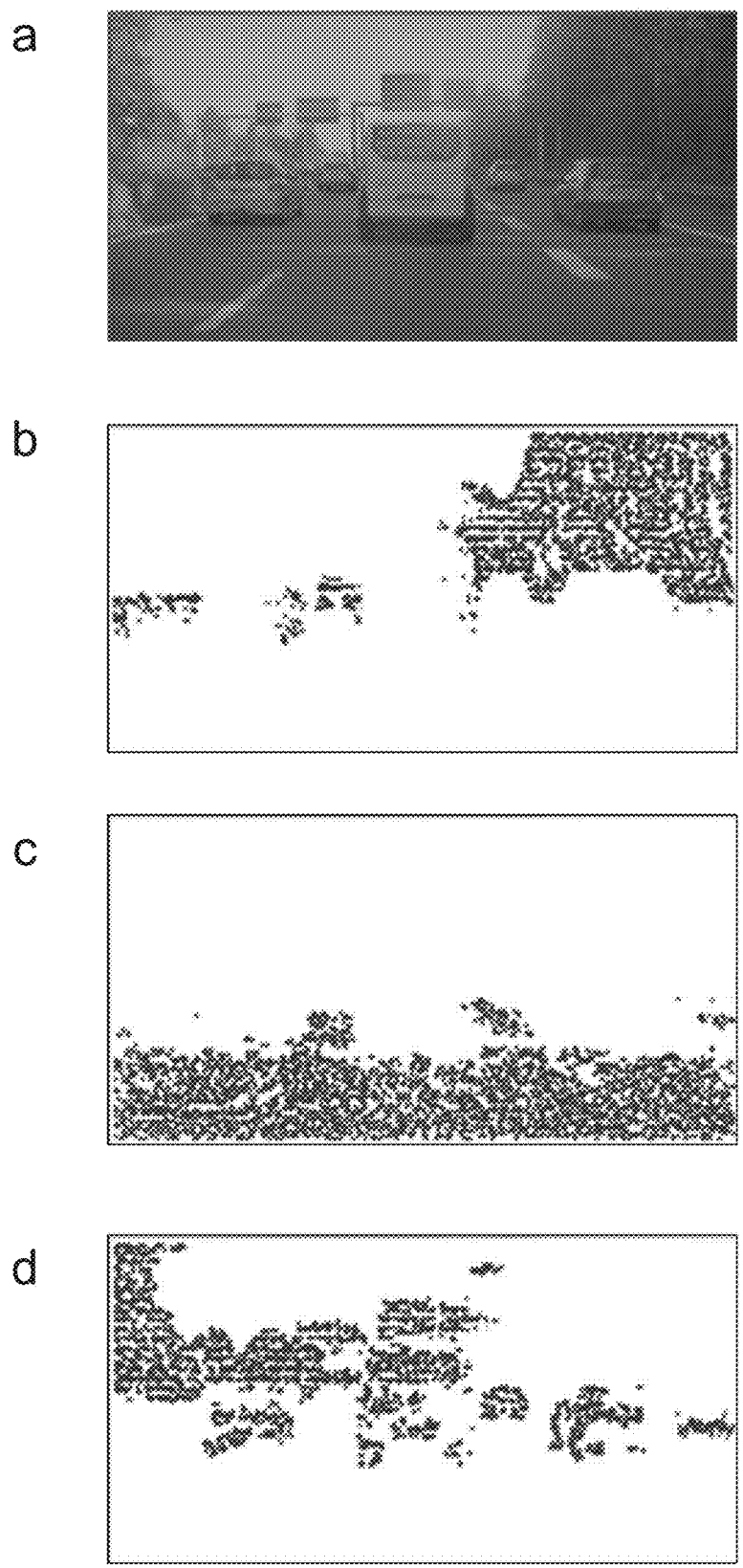
FIG. 6 shows a plane orientation for target validation (validation of potential collision objects)

FIG. 6 shows a determination of the orientation of planes in the scene already described in FIG. 5. FIG. 6a again shows, for the purposes of orientation, the surrounding situation according to FIG. 5a.

All of the correspondences which are associated with a side plane are shown in FIG. 6b. The correspondences at the left edge have been associated with a right side plane, which is correct because the right side of the structural delimitation (52) with respect to the opposite carriageway is located there in the image. The correspondences in the right half of the image have been associated with the left side planes, which is likewise correct, because the "left side" of the road peripheral development or planting of vegetation is located there in the image. FIG. 6c shows which correspondences are associated with a ground plane, which is correct, because the surface of the road (51) can be seen there in the image.

FIG. 6d shows which correspondences are associated with a back plane. This is mostly correct. Different back planes cannot yet be sufficiently distinguished from this determination alone, e.g. that of the delivery van (53) driving ahead on the same lane from the signs of the sign gantry (54) arranged above it in the image. However, important information regarding where elevated objects occur in the surroundings of the vehicle can already be extracted from this representation.

Figure 7:
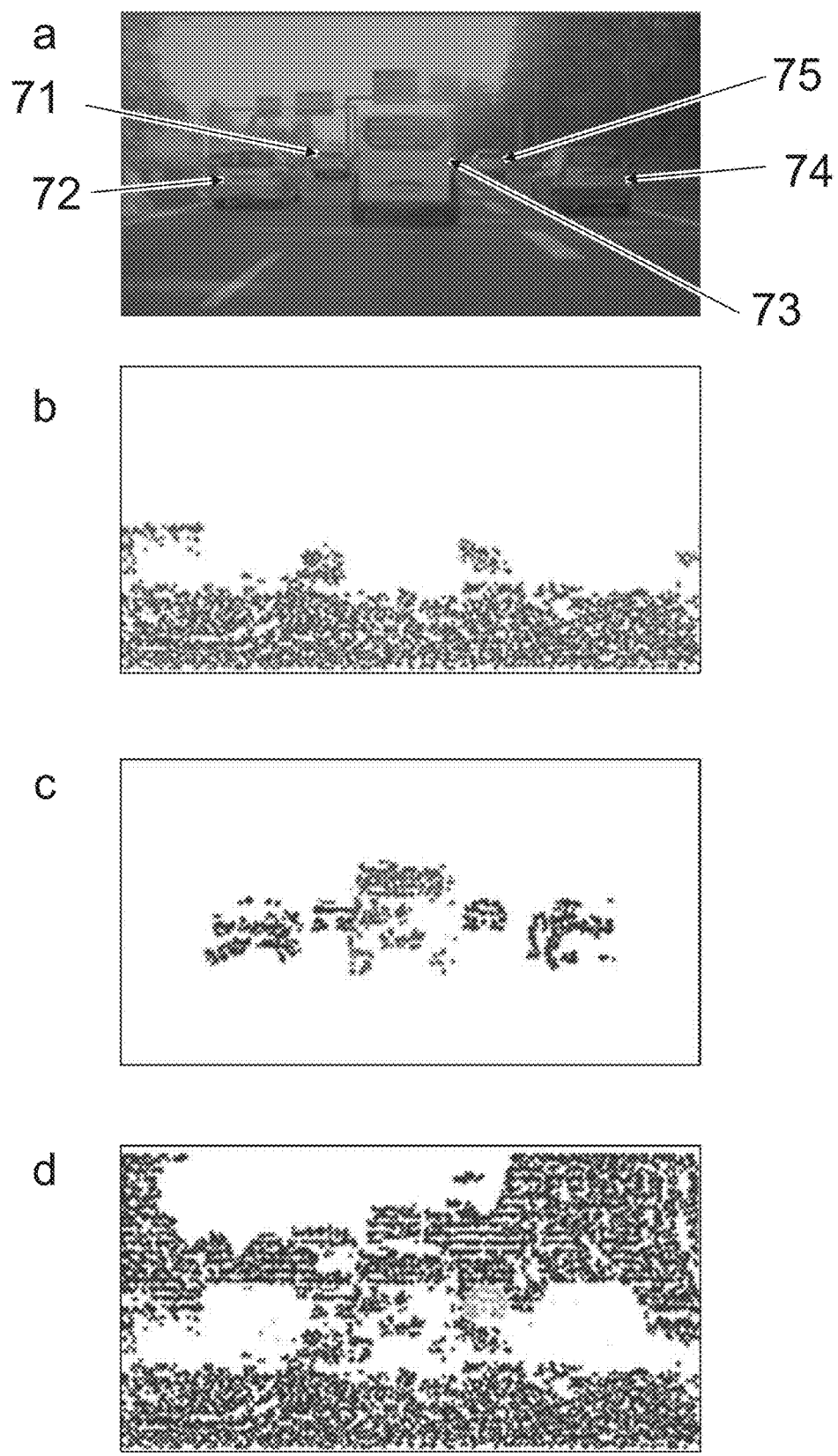
FIG. 7 shows time to collision monitoring.

As illustrated in FIG. 7, the inverse 170 ($t_x$ $t_y$, $t_z$) can be used to identify dynamic objects.

FIG. 7a, in turn, shows the image of the vehicle situation (identical to FIG. 6a). The vehicle (73) driving ahead on the ego lane is a delivery van. Two vehicles (71 and 72) are driving on the left lane and two further vehicles (74 and 75) are driving on the right lane.

FIG. 7b shows correspondences which, in turn, correspond to the ground plane (violet in the original) and are the only ones to have a red proportion or color component.

FIG. 7c shows correspondences which are associated with moving objects. These are green in the original if they are moving away from the ego vehicle (that is to say they are driving faster), or turquoise if they are driving more slowly.

FIG. 7d shows correspondences having a blue proportion or component, that is to say those which correspond to the ground plane (cf. FIG. 7b), moving objects which are approaching the ego vehicle (cf. FIG. 7c) and those which correspond to static elevated objects, these are only represented in FIG. 7d, such as e.g. woodland to the left and right of the motorway and the sign gantries. It can be seen from FIGS. 7c and 7d jointly that the vehicle (73) is approaching on the ego lane. The same applies to the front vehicle (75) on the right lane. On the other hand, the remaining vehicles (71, 72 and 74) are moving away.

Due to a lack of structure in the image, the region which corresponds to the sky in the image does not result in any correspondences (white in FIGS. 7b to 7d).

If the natural rotation is considered in the correspondences prior to the computation of the homography or homograph, or if the natural rotation is considered in the rotation matrix R, overtaking vehicles can be identified due to their negative $t_z$ component, or swerving vehicles or vehicles driving in a curve can be identified by a nonzero lateral t, component. If the dynamic segments are predicted by means of their homographs (see "consolidation of the optical flux based on homographs" below), a dynamic map can be constructed over time.

If equation 3 is observed, it can be seen that segments having an inverse TTC equal to zero describe the rotation matrix and these can be established by computing a homograph with a full degree of freedom (equation 2) from segments with t/d equal to zero. If it is assumed that the translatory components in the vicinity of the epipole cannot make themselves felt, the pitch rate and yaw rate can also be established by predicting the coordinates of the epipole ($x_e$ $y_e$) through the homograph of static segments and computing the atan $((x_{e0}-x_{e1})/f)$ or atan $((y_{e0}-y_{e1})/f)$ with the focal length f based on one pixel.

If a homograph is computed with all degrees of freedom for each cluster, this can also be used to reconstruct the 3D surroundings in that, instead of the measured position $x_{t0}$, the predicted position $H^* x_{t1}$ is used for triangulation. This not only reduces the effect of measuring errors, but also makes it possible to reconstruct objects close to the epipole.

One embodiment example for consolidating the optical flux based on homographs is described below.

If the segmentation is known at the point in time t−1, it can be used to both predict the objects and to generate a dense flux field. Signature-based flux methods produce signatures and cause these to be clearly associated in consecutive frames. The signatures are mostly computed from a patch (image section or image region) of a defined size. If, however, the size and form of a patch alter, it is no longer possible to find a correspondence with a fixed template (model, specimen, e.g. an image section of an image of the series of images, which corresponds to an object—for example a vehicle template—is meant). If e.g. one is approaching a back plane, the size of a patch changes. Or if one is moving over a ground plane or parallel to a side plane, both the size and the form of a patch change, see FIGS. 1 and 2). If the segmentation exists at the point in time t−1, the homographs can be computed again by means of flux vectors which have already been found, and can be used to predict the position and form of correspondences of t−1 to t−0 which have already been established.

Alternatively, the current frame can be transformed at the point in time t−0 to the point in time t−1, in order to compensate for changes in scale and form.

Figure 8:
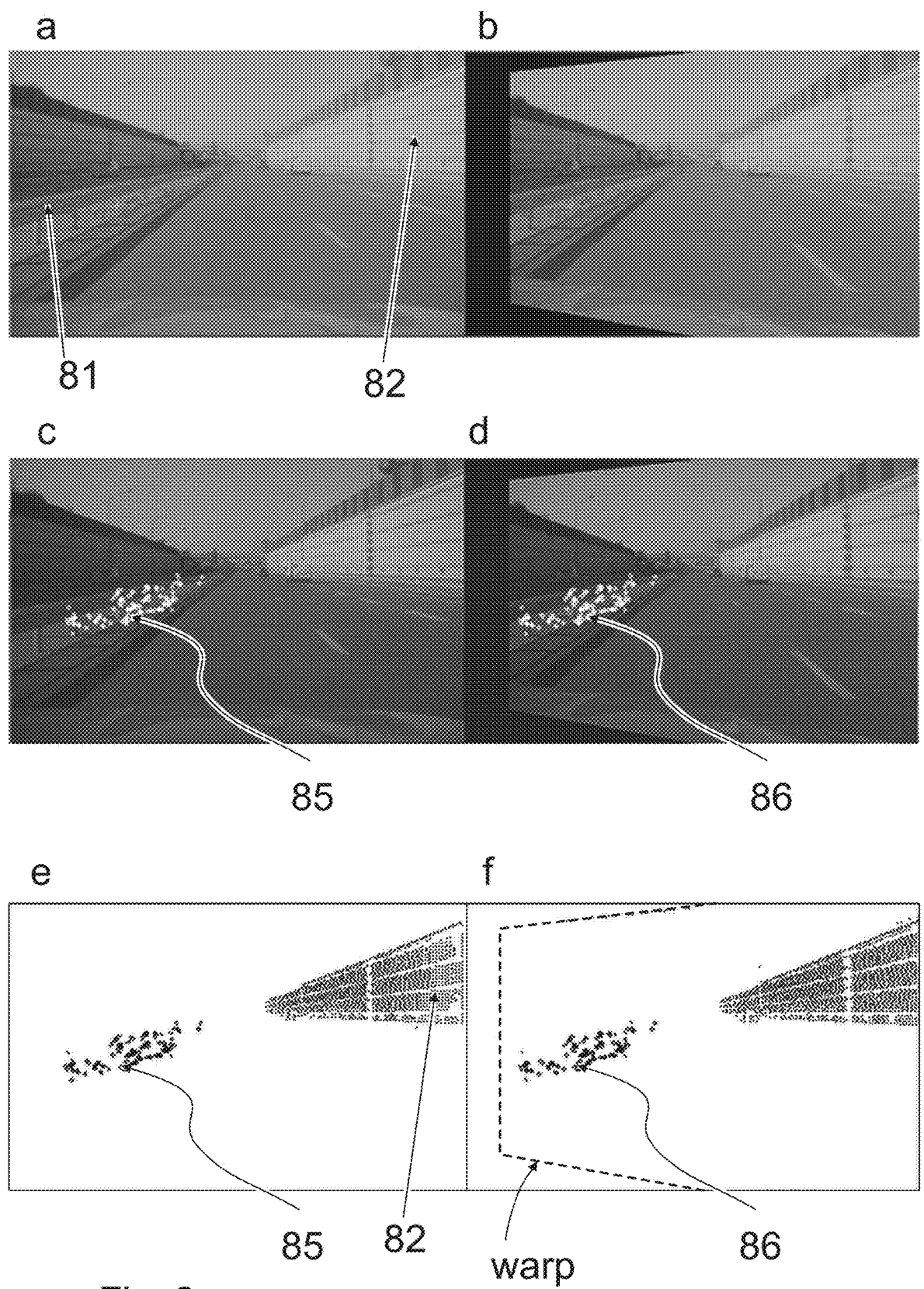
FIG. 8 shows a projection (or warping) of the guardrail segment at the point in time t–0 (right) onto t–1 (left).

FIG. 8 illustrates such a procedure.

FIG. 8a shows an image of another driving situation which has been captured by the vehicle camera at a point in time t−1. A motorway having three lanes in each direction of travel can be seen. To the left of the ego three-lane road there is a guardrail (81) as an elevated delimitation with respect to the opposite carriageway. A noise barrier (82) is located on the right of the road.

FIG. 8b shows an image which was captured at the subsequent point in time t and transformed (warped) by means of the homograph of the guardrail such that the changes in the image occurring as a consequence of the motion of the vehicle and therefore of the vehicle camera between the two capturing times are compensated for in the region of the guardrail. In FIG. 8b, the forward motion of the ego vehicle results in the most obvious graduation line of the lane marking being closer to the ego vehicle than in FIG. 8a. The transformation results in the trapezoidal shifting of the image, which is illustrated by a dashed line in FIG. 8f.

FIG. 8c then shows corresponding features (85), which have been determined in the region of the guardrail (81, cf. FIG. 8a), as white dots.

FIG. 8d shows where these corresponding features (86) are to be expected in the next image, after said image has been transformed as described with reference to FIG. 8b.

In FIGS. 8e and 8f, this state of affairs is again shown in a black and white representation, wherein the corresponding features (85) now correspond to the black dots on the guardrail (81) in the left half of the image.

In order to generate a dense flux field, the current image can thus be warped onto the previous image for each segment, in order to rediscover already existing correspondences which have changed in their scale or form, or in order to establish new correspondences by means of congruent templates.

If not enough flux vectors for computing a homograph again are present in a current frame, the homograph from the last frame can be approximately used to make the correspondence finding more robust to changes in form and scale.

The following configuration forms or aspects are advantageous and can be provided individually or in combination:

1. The image is subdivided into NxM cells and a clear i.e. unique or unambiguous cell ID is assigned to the point correspondences of a cell. The back plane, ground plane and side plane homographies or homographs (equations 9, 10 and 10) are computed by means of RANSAC from the correspondences with the same IDs, and both the homograph having the lowest reprojection or back projection error and the sampling points used to calculate the homograph are stored. In the case of the RANSAC (RAndom SAmple Consensus) method, a minimum number of randomly selected correspondences is usually used for each iteration, in order to form a hypothesis. A value, which describes whether the corresponding feature supports the hypothesis, is subsequently computed for each corresponding feature. If the hypothesis attains sufficient support through the corresponding features, then the non-supporting corresponding features can be rejected as outliers. Otherwise, a minimum number of correspondences is selected again at random.

2. The reprojection or back projection errors $\Sigma x_{t0}^i - H_j x_{t1}^i$ or $\Sigma x_{t0}^j - H_i x_{t1}^j$ are computed by means of the sampling points of the adjacent homography or homograph for adjacent cells i, j. If the back projection error $\Sigma x_{t0}^i - H_j x_{t1}^i$ is less than $\Sigma x_{t0}^j - H_i x_{t1}^j$ or if the errors fall below a threshold standardized for the flux length, the IDs are combined and the homographs are computed again. In particular, two adjacent cells can be clustered as belonging to the same plane (or to the same segment or to the same object), if the back projection error $\Sigma_i(x_{t0}^i - H_j x_{t1}^i)$ is less than $\Sigma_i(x_{t0}^i - H_i x_{t1}^i)$ and if both back projection errors $\Sigma_i(x_{t0}^i - H_j x_{t1}^i)$ and $\Sigma_i(x_{t0}^i - H_i x_{t1}^i)$ fall below a threshold standardized for the flux length.

3. The reprojection or back projection errors $x_{t0} - H_j x_{t1}$ of all of the point correspondences are computed for the adjacent segments and a point correspondence is associated with the segment having the lowest back projection error. If the minimum error exceeds a threshold, the correspondences are provided with a new object ID in order to also be able to identify smaller or partially concealed objects.

4. The homographs of the segments extracted at the point in time t–1 are computed again at the start of a new frame (t–0) by means of the image correspondences already found and the already existing segment IDs in the current frame are predicted. If not enough flux vectors are available to compute a homograph again in the current frame, the homographs from the last frame can be approximately used.

5. In order to generate a dense flux field, the current frame (t–0) is warped onto the last frame (t–1) for each segment, in order to rediscover already existing correspondences which have changed in their scale or form, or in order to establish new correspondences.

6. The reprojection or back projection errors of the back plane, ground plane and side plane can be used to validate elevated targets, see FIG. 6.

7. If e.g. a disparity map exists in a vehicle stereo camera, the absolute speeds can be computed from the inverse TTC t/d, because then the absolute distances d are present for individual pixels in the disparity map.

8. If a complete homograph is computed with all degrees of freedom for each segment, the rotation matrix R can be established from segments having a TTC close to infinite (or inverse TTCs approaching zero).

9. The 3D surroundings can be reconstructed from the predicted position $(Hx_{t1}, x_{t1})$ instead of the measured position $(x_{t0}, x_{t1})$ and make it possible to also reconstruct objects at the epipole.

The invention claimed is:

1. A method of detecting objects, comprising the steps:
   a) with a camera of a vehicle, capturing a series of images including a first image at a first time and a second image at a second time after the first time;
   b) determining a plurality of corresponding feature pairs, wherein each one of the corresponding feature pairs respectively consists of corresponding first and second features in the first and second images;
   c) establishing a plurality of spatial planes, wherein each respective spatial plane of the plurality of the spatial planes is established respectively by associating, with the respective spatial plane, a plurality of adjacent feature pairs among the corresponding feature pairs, wherein the plurality of the spatial planes includes at least one back plane extending normal to a longitudinal direction of the vehicle and/or at least one ground plane extending horizontally, and wherein the plurality of the spatial planes may optionally additionally include at least one side plane extending vertically and along the longitudinal direction of the vehicle; and
   d) detecting objects in the series of images, taking into account and dependent on the spatial planes that have been established.

2. The method according to claim 1, wherein the spatial planes include at least one said back plane.

3. The method according to claim 1, wherein the spatial planes include at least one said ground plane.

4. The method according to claim 1, wherein the spatial planes include at least one said side plane.

5. The method according to claim 1, wherein the detecting of the objects comprises deducing that the adjacent feature pairs associated with one of said at least one ground plane represent a road hypothesis.

6. The method according to claim 1, wherein the detecting of the objects comprises deducing that the adjacent feature pairs associated with one of said at least one back plane represent an elevated object hypothesis.

7. The method according to claim 1, wherein the associating of the adjacent feature pairs with the respective spatial planes comprises computing homographies and using the homographies to associate the adjacent feature pairs with the respective spatial planes.

8. The method according to claim 7, wherein the homographies describe correspondences of points or features in the first image at the first time with same or corresponding points or features in the second image at the second time.

9. The method according to claim 7, wherein the associating of the adjacent feature pairs with the respective spatial planes comprises:
computing respective ones of the homographies respectively for the ground plane, the back plane and the side plane,
projecting the first feature from the first image as a respective projected feature respectively onto the ground plane, the back plane and the side plane using respective applicable ones of the homographies,
determining respective reprojection errors as respective differences between the second feature in the second image and the respective projected feature respectively for the ground plane, the back plane and the side plane, and
selecting, as the spatial plane to which the adjacent feature pairs are associated, the one of the ground plane, the back plane and the side plane for which the respective reprojection error is the smallest among the reprojection errors.

10. The method according to claim 7, wherein a respective one of the homographies is computed for the back plane in accordance with:

$$\begin{bmatrix} x_0 c - a \\ y_0 c - b \\ \vdots \end{bmatrix} = \begin{bmatrix} -x_0 & 0 & x_1 x_0 \\ 0 & -x_1 & x_1 y_0 \\ & \vdots & \end{bmatrix} \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$ and $t_z$ are components of a vector t/d, t describes a translation of the camera, and d describes a distance from the respective plane.

11. The method according to claim 7, wherein a respective one of the homographies is computed for the ground plane in accordance with:

$$\begin{bmatrix} x_0 c - a \\ y_0 c - b \\ \vdots \end{bmatrix} = \begin{bmatrix} -y_1 & 0 & y_1 x_0 \\ 0 & -y_1 & y_1 y_0 \\ & \vdots & \end{bmatrix} \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$ and $t_z$ are components of a vector t/d, t describes a translation of the camera, and d describes a distance from the respective plane.

12. The method according to claim 7, wherein a respective one of the homographies is computed for the side plane in accordance with:

$$\begin{bmatrix} x_0 c - a \\ y_0 c - b \\ \vdots \end{bmatrix} = \begin{bmatrix} -1 & 0 & x_0 \\ 0 & -1 & y_0 \\ & \vdots & \end{bmatrix} \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$ and $t_z$ are components of a vector t/d, t describes a translation of the camera, and d describes a distance from the respective plane.

13. The method according to claim 7, further comprising segmenting the corresponding feature pairs by use of the homographies.

14. The method according to claim 7, further comprising subdividing each one of the images into plural cells based on a grid, wherein the computing of the homographies comprises computing a respective homography for each respective one of the cells based on the corresponding feature pairs contained in the respective cell, and further comprising clustering the ones of the cells of which the respective homographies match each other.

15. The method according to claim 14, further comprising determining a cluster boundary within a first one of the cells when the homography computed for the first cell does not sufficiently match the homography computed for a second one of the cells that is adjacent to the first cell, by comparing a reprojection error of a respective one of the corresponding feature pairs contained in the first cell with respective reprojection errors of the respective homographies of a plurality of the cells that are adjacent to the first cell, and assigning the respective corresponding feature pair to the one of the adjacent cells for which the respective homography produces the reprojection error that is the smallest among the reprojection errors.

16. The method according to claim 1, wherein the spatial planes include a plurality of mutually parallel planes, comprising a plurality of the back planes or a plurality of the ground planes or a plurality of the side planes, wherein each respective one of the planes has a respective normal vector associated therewith and a distance component along the respective normal vector, and further comprising distinguishing the mutually parallel planes from one another based on different values of the respective distance components of the respective normal vectors of the mutually parallel planes.

17. The method according to claim 1, wherein the establishing of the spatial planes by the associating of the adjacent feature pairs with the spatial planes is performed for substantially an entire image area of the images.

18. The method according to claim 1, further comprising operating a driver assistance system of the vehicle in response to and dependent on the detected objects.

19. A device for detecting objects, comprising a camera controller and evaluation electronics, wherein:
the camera controller is configured to capture, with a camera of a vehicle, a series of images including a first image at a first time and a second image at a second time after the first time; and
the evaluation electronics are configured:
to determine a plurality of corresponding feature pairs, wherein each one of the corresponding feature pairs respectively consists of corresponding first and second features in the first and second images;

to establish a plurality of spatial planes, wherein each respective spatial plane of the plurality of the spatial planes is established respectively by associating, with the respective spatial plane, a plurality of adjacent feature pairs among the corresponding feature pairs, wherein the plurality of the spatial planes includes at least one back plane extending normal to a longitudinal direction of the vehicle and/or at least one ground plane extending horizontally, and wherein the plurality of the spatial planes may optionally additionally include at least one side plane extending vertically and along the longitudinal direction of the vehicle; and to detect objects in the series of images, taking into account and dependent on the spatial planes that have been established.

20. The device according to claim 19, wherein the camera is a single monocular camera.

* * * * *